US008602045B2

(12) United States Patent
Downer et al.

(10) Patent No.: US 8,602,045 B2

(45) Date of Patent: Dec. 10, 2013

(54) CLEAN-IN-PLACE VALVE ASSEMBLY AND METHOD OF OPERATION

(75) Inventors: Bryan Downer, Springfield, MO (US); Paul Marcink, Springfield, MO (US)

(73) Assignee: Central States Industrial, Inc., Springfield, MO (US)

( * ) Notice: Subject to any disclaimer, the term of this patent is extended or adjusted under 35 U.S.C. 154(b) by 216 days.

(21) Appl. No.: 13/029,217

(22) Filed: Feb. 17, 2011

(65) Prior Publication Data

US 2012/0211090 A1 Aug. 23, 2012

(51) Int. Cl.

| | |
|---|---|
| ***B08B 3/00*** | (2006.01) |
| ***B08B 5/00*** | (2006.01) |
| ***F16K 11/00*** | (2006.01) |
| ***F16K 51/00*** | (2006.01) |
| ***F16K 15/00*** | (2006.01) |
| ***F16K 21/04*** | (2006.01) |

(52) U.S. Cl.

USPC ......... 137/15.04; 137/240; 137/522; 137/602

(58) Field of Classification Search

USPC ................. 137/238, 240, 237, 602, 239, 522, 137/15.06, 15.04

See application file for complete search history.

(56) References Cited

U.S. PATENT DOCUMENTS

| | | | | |
|---|---|---|---|---|
| 2,686,528 | A | 8/1954 | Snyder | |
| 4,339,111 | A * | 7/1982 | Welch | 251/331 |
| 4,457,340 | A * | 7/1984 | Krueger | 137/625.5 |
| 4,687,015 | A * | 8/1987 | Mieth | 137/238 |
| 5,282,889 | A | 2/1994 | Franklin | |
| 5,564,457 | A | 10/1996 | Beck | |
| 6,601,603 | B2 | 8/2003 | Griffin | |
| 6,866,059 | B2 | 3/2005 | Griffin | |
| 2009/0277206 | A1* | 11/2009 | Laufenberg et al. | 62/285 |

* cited by examiner

*Primary Examiner* — John K Fristoe, Jr.

*Assistant Examiner* — Michael R Reid

(74) *Attorney, Agent, or Firm* — Alvin R. Wirthlin

(57) ABSTRACT

A valve assembly for a clean-in-place operation includes a valve body with a valve seat and inner cavity. A shaft extends through the valve body and a stopper is connected to the shaft for movement between a normally closed position and an open position to permit cleaning fluid to enter and exit the inner cavity only through the valve. An actuator contacts the shaft for moving the stopper toward the open position. An air inlet extends into the inner cavity. A stop valve associated with the inlet prevents fluid from exiting through the inlet such that cleaning fluid only enters and exits the inner cavity through the valve seat A source of pressurized air opens the stop valve and causes drying air to enter the cavity and move the stopper toward the open position and supply the air to the processing system.

20 Claims, 5 Drawing Sheets

CLEAN-IN-PLACE VALVE ASSEMBLY AND METHOD OF OPERATION

BACKGROUND OF THE INVENTION

This invention relates to processing systems including the transportation of semi-solid, liquid, and/or gaseous phases of foods and/or chemicals through conduits, into and out of holding tanks, and so on, during various manufacturing and/or packaging operations, and more particularly to a valve assembly and method for supplying gases or air to the processing system.

Systems for processing and/or transporting foods, chemicals and so forth between various locations in a processing plant can be as varied as the foods and chemicals produced and/or packaged. Such systems typically require a thorough cleaning after each batch or run. However, disassembling the vast array of conduits, holding tanks and other processing equipment in order to clean them would be a time-consuming and labor-intensive task, requiring more down time than run time. Accordingly, clean-in-place components have been introduced to minimize disassembly of the processing equipment.

In situ valves for providing air or gases during processing or after a cleaning operation are important components of the processing system since removal of product from the process lines before cleaning or another process run reduces contamination. Prior art valves of this type typically include a valve body connected to a pressurized source of drying air and a stopper that seals against a valve seat of the valve body when the drying air is removed. The purpose of the stopper is to prevent contaminants from entering the valve body and the pressurized air source. However, it has been found that contaminants can collect in the small areas between the valve seat and stopper, which may not be completely removed by the cleaning fluid.

Accordingly, it would be desirous to provide a valve assembly for clean-in-place operations that allow the small areas between the valve seat and stopper to be cleaned without the necessity of breaching the processing system. It would also be desirous to provide a valve assembly that is relatively simple in construction and operation.

BRIEF SUMMARY OF THE INVENTION

In accordance with one aspect of the invention, a valve assembly configured for a clean-in-place operation includes a valve body with a lower surface, a valve seat extending into the valve body from the lower surface, an inner cavity extending into the valve body from the valve seat, and a separate inlet extending through the valve body and into the inner cavity. The valve assembly also includes a shaft extending through the valve body for reciprocal movement, a stopper connected to one end of the shaft for movement between a normally closed position wherein the stopper sealingly engages the valve seat and an open position wherein the stopper is spaced from the valve seat to permit cleaning fluid to enter and exit the inner cavity only between the valve seat and stopper, an actuator connected to the valve body, and a stop valve operatively associated with the inlet. The actuator includes a plunger adapted for contacting an opposite end of the shaft for moving the stopper to the open position when activated. The stop valve is in a normally closed position for preventing fluid from exiting through the inlet such that cleaning fluid only enters and exits the inner cavity through the valve seat when the plunger is in the open position. The stop valve is connectable to a source of pressurized air to thereby open the stop valve and cause air or other gas to enter the inner cavity with sufficient pressure to move the stopper toward the open position.

According to a further aspect of the invention, a valve assembly configured for a clean-in-place operation includes a valve body with a lower surface, an upper surface spaced from the lower surface, a valve seat extending into the valve body from the lower surface, and an inner cavity extending into the valve body from the valve seat. The valve assembly further includes a shaft extending through the valve body for reciprocal movement, a stopper connected to one end of the shaft for movement between a normally closed position wherein the stopper sealingly engages the valve seat and an open position wherein the stopper is spaced from the valve seat to permit cleaning fluid to enter and exit the inner cavity, and a biasing member located outside of the inner cavity and connected to the shaft to thereby bias the stopper toward the normally closed position.

According to yet another aspect of the invention, a clean-in-place method includes: connecting a clean-in-place valve to a conduit of a processing system, the valve including an inner cavity with a valve seat, and a stopper movably between a closed position in sealing engagement with the valve seat and an open position where the inner cavity is in fluid communication with the conduit; flowing cleaning fluid through the conduit; moving the stopper to the open position to cause the cleaning fluid to flow around the stopper, past the valve seat and into the inner cavity only from the conduit to thereby clean the stopper, valve seat and inner cavity; stopping the flow of cleaning fluid through the conduit; moving the stopper to the closed position; sending pressurized drying fluid into the inner cavity to thereby move the stopper to the open position and supply drying fluid to the inner cavity, the stopper and at least the conduit; and stopping the flow of pressurized drying fluid to thereby move the stopper to the closed position.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
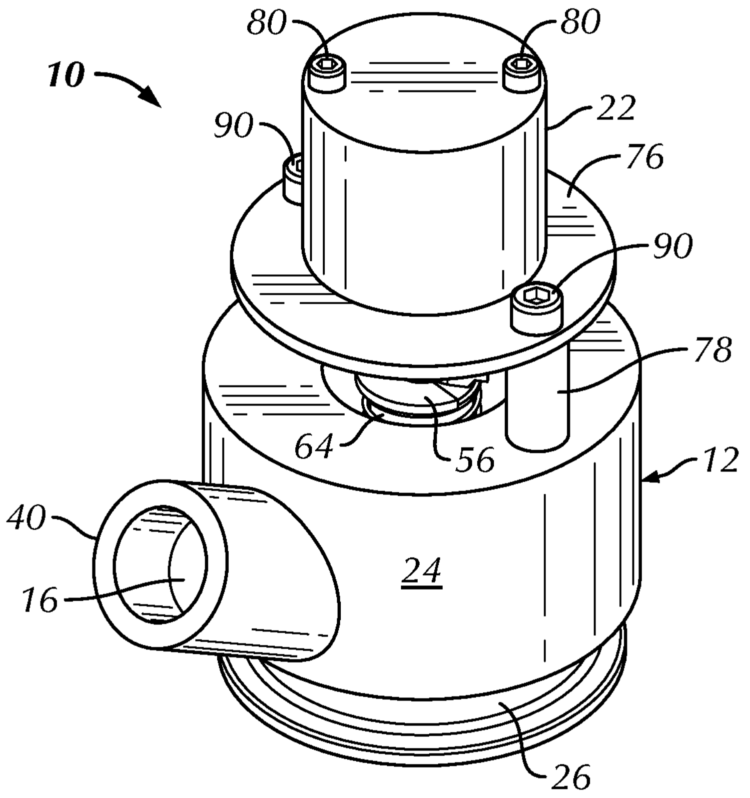
FIG. 1 is an isometric view of a clean-in-place valve assembly in accordance with the present invention.
Figure 2:
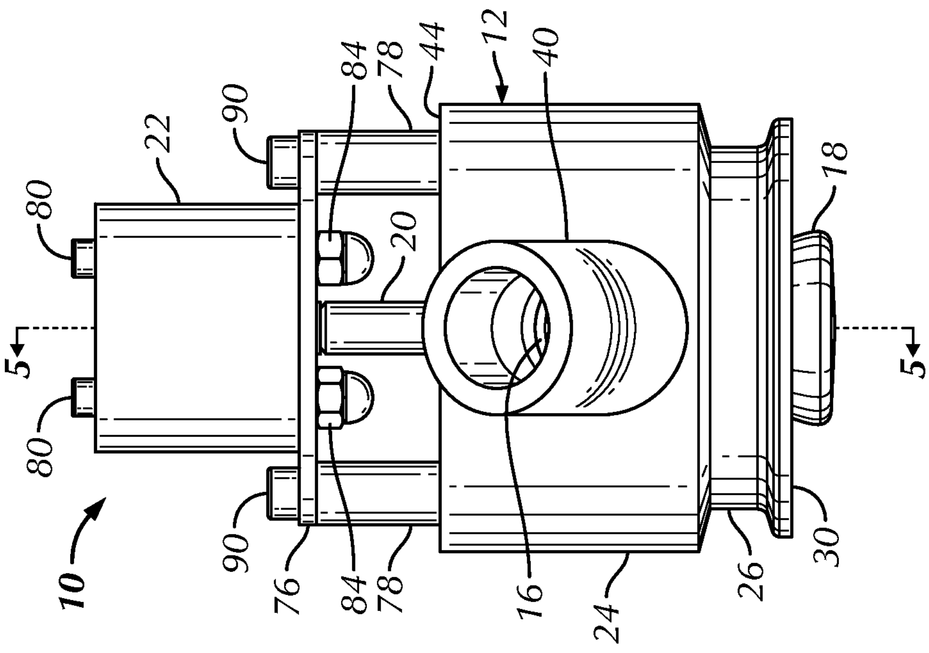
FIG. 2 is a front elevational view thereof.
Figure 3:
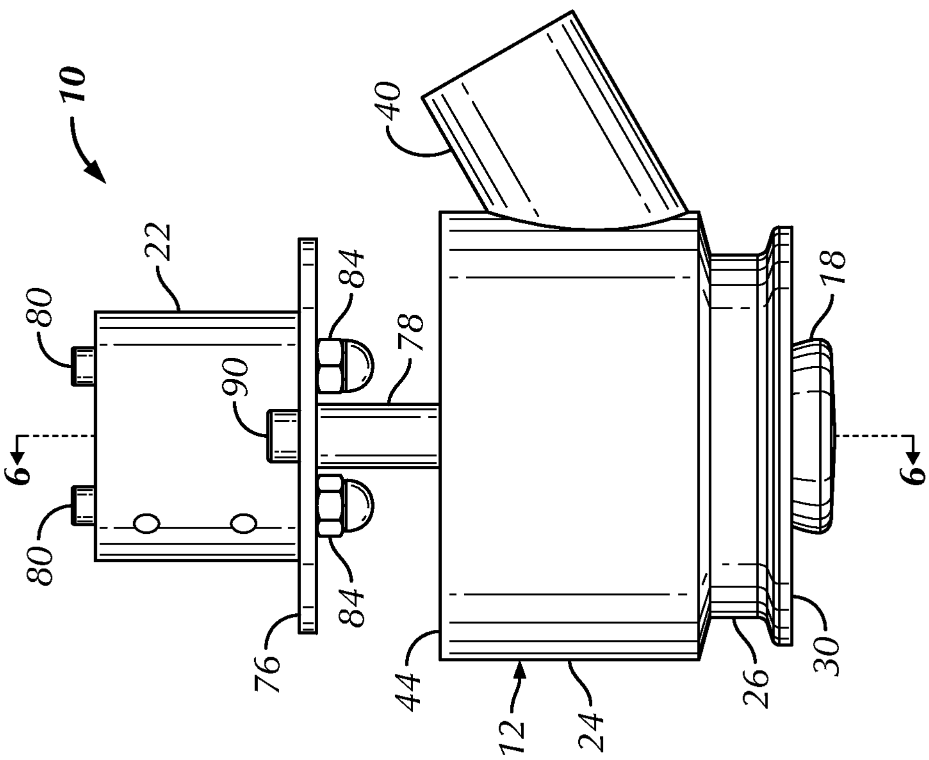
FIG. 3 is a right side view thereof.

Referring to the drawings, and to FIGS. 1-3 in particular, a valve assembly 10 for clean-in-place operations in accordance with a preferred embodiment of the invention is illustrated. The valve assembly 10 is particularly suited for introducing compressed drying air into a processing system for evacuating the contents of the processing system and/or drying the internal surfaces of conduits and other system components during a clean-in-place operation. Such processing systems include, without limitation, the transportation of semi-solid, liquid, and/or gaseous phases of foods and/or chemicals during various manufacturing and/or packaging operations. The valve assembly 10 is also especially suited for introducing a blanket or pocket of gas, a combination of gases or other fluids during regular processing operations.

The valve assembly 10 preferably includes a valve body 12 with a fluid inlet 14, a stop valve 16 (FIG. 2) located within the inlet 14, a stopper 18 adapted for reciprocal movement between open and closed positions with respect to the valve body 12, a shaft 20 connected to the stopper 18 for reciprocal movement therewith, and an actuator 22 connected to the valve body 12 and adapted for contacting the shaft 20 to thereby move the stopper 18 toward the open position when the actuator 22 is activated and allow movement of the stopper 18 toward the closed position when the actuator is deactivated.

Figure 4:
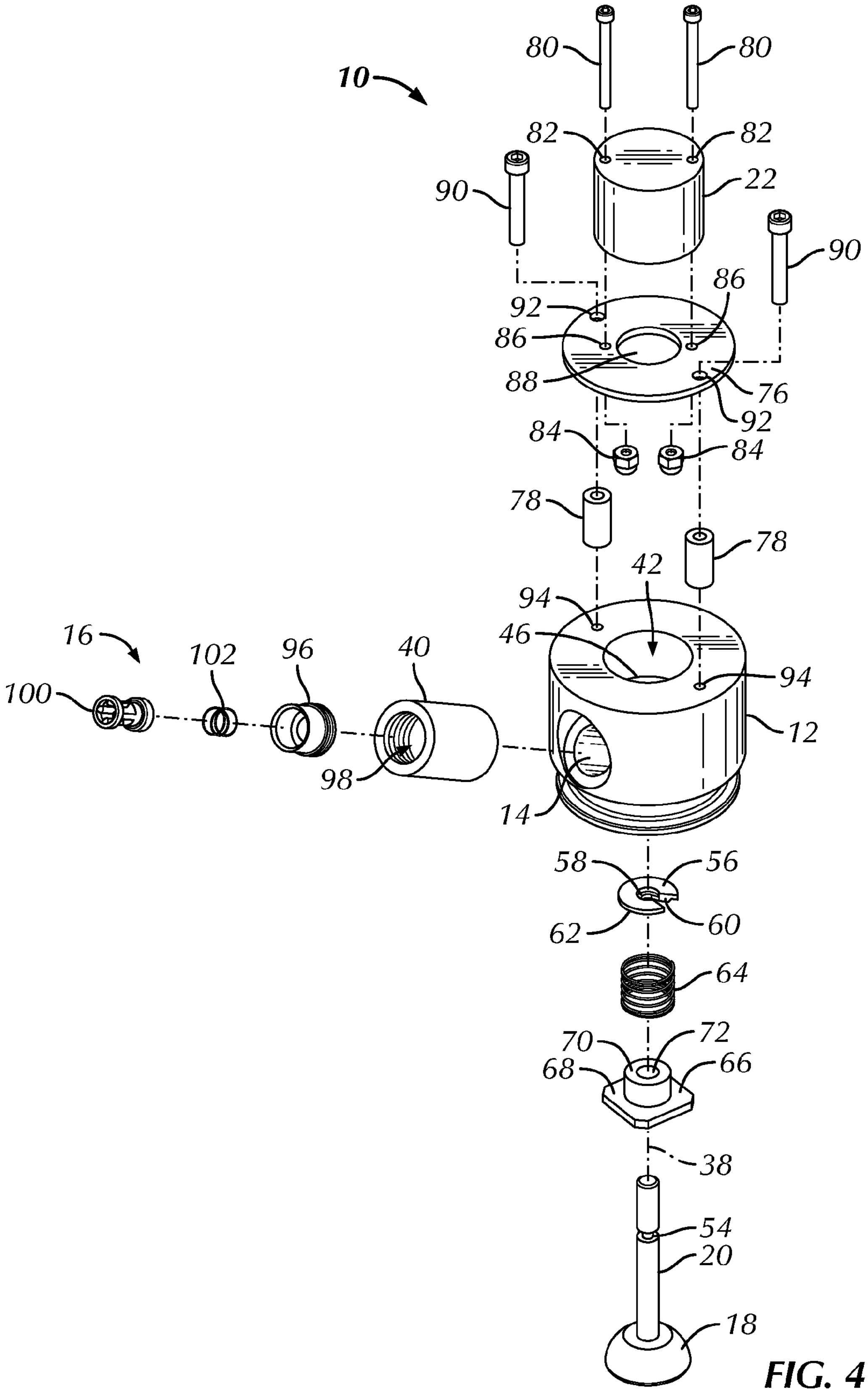
FIG. 4 is an exploded isometric view thereof.
Figure 6:
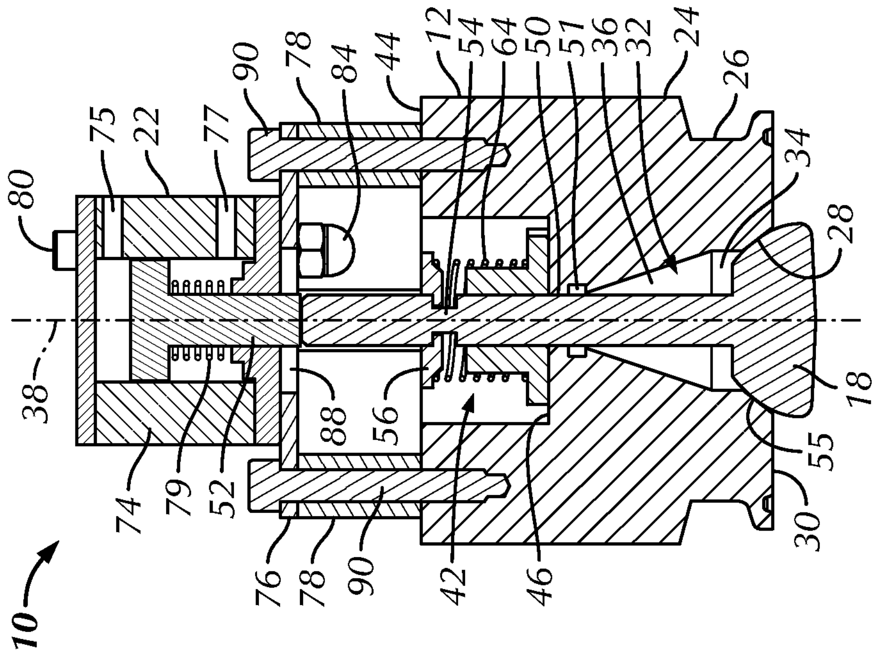
FIG. 6 is a sectional view of the valve assembly taken along line 6-6 of FIG. 3.
Figure 5:
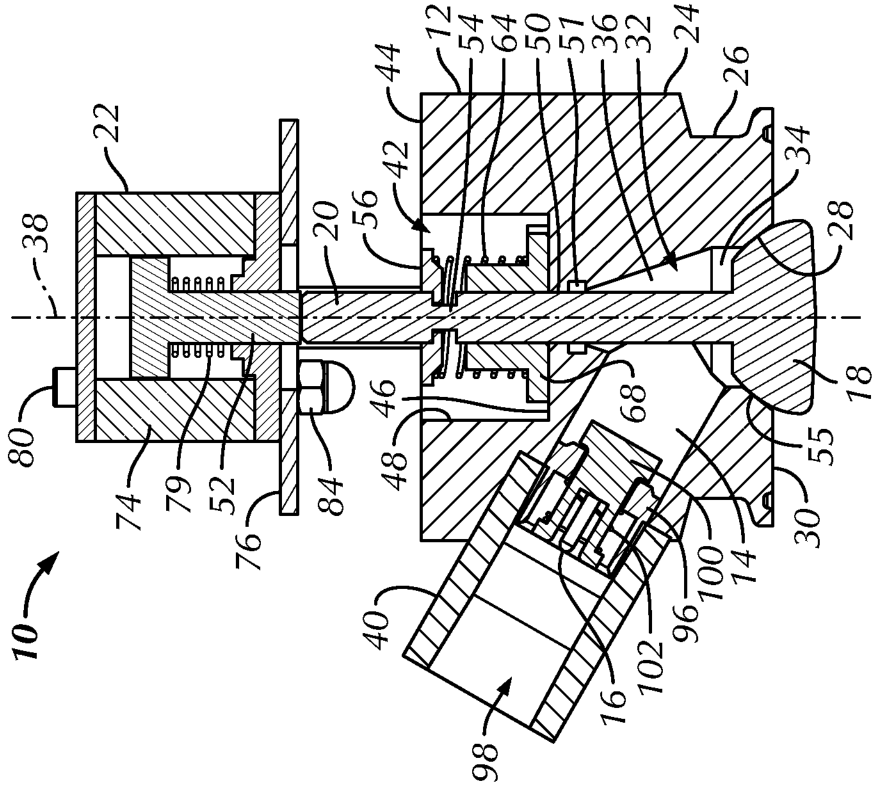
FIG. 5 is a sectional view of the valve assembly taken along line 5-5 of FIG. 2.

With additional reference to FIGS. 4-6, the valve body 12 is preferably generally cylindrical in shape and includes an outer side surface 24 with a lower annular groove 26 formed therein for mounting the valve assembly 10 to a conduit or other system component in a well-known manner. An annular valve seat 28 is formed in a bottom surface 30 of the valve body for receiving the stopper 18 in sealing engagement. The seat 28 extends generally upwardly and inwardly and is in fluid communication with an inner cavity 32 formed in the valve body 12. As best shown in FIGS. 5-6, the inner cavity 32 preferably has a first inner wall 34 that extends upwardly from the seat 28 and a second inner wall 36 that extends upwardly and inwardly from the first inner wall to form a generally conically-shaped inner cavity. The first and second inner walls 34, 36 are preferably coaxial with a central axis 38 of the valve body 12. The conical shape of the inner cavity 32 ensures that fluid droplets and/or particles that may adhere to the inner wall 36 are efficiently removed when drying air is applied through the inlet 14.

The inlet 14 is preferably formed as a cylindrical opening that extends downwardly and inwardly at an acute angle with respect to the central axis 38 of the valve body 12 from the outer side surface 24 of the valve body and intersects with the inner cavity 32. A sleeve 40 preferably extends into the inlet 14 and protrudes outwardly and upwardly from the valve body 12. The sleeve 40 can be attached to the valve body through any well-known connection means such as mutually engaging threads on the valve body and sleeve, press-fitting, adhesive bonding, interference fitting, and so on.

A depression 42 is preferably formed in the valve body 12 and extends downwardly from the upper surface 44 of the valve body. The depression 42 is preferably cylindrical in shape and includes a bottom wall 46 and continuous side wall 48 that extends upwardly therefrom. The depression 42 is preferably coaxial with the central axis 38 of the valve body 12. A passageway 50 extends between the depression 42 and inner cavity 32 and is sized to receive the shaft 20 for reciprocating movement with respect to the valve body. An O-ring 51 is located within the passageway 50 and is in sealing engagement with the shaft 20.

The shaft 20 extends from the stopper 18 upwardly through the inner cavity 32, passageway 50, and depression 42. The shaft 20 preferably protrudes beyond the upper surface 44 of the valve body for engaging a plunger 52 of the actuator 22. Preferably, the shaft 20 and stopper 18 are formed separately and connected together through well-known connection means. For example, the shaft can be constructed of stainless steel and the stopper can be constructed of an elastomeric material for sealing against the valve seat 28 when in the retracted or closed position. It will be understood that the shaft and stopper can be constructed of any suitable material. It will be further understood that the shaft and stopper can be integrally formed from a single piece of material without departing from the spirit and scope of the invention. The stopper 18 is preferably formed with an upper surface 55 that is complementary to the shape of the valve seat 28 to seal the inner cavity 32 against the ingress of foreign material during processing operations. An annular groove 54 is formed in the shaft 20 for receiving an upper spring retainer 56.

As shown in FIG. 4, the upper spring retainer 56 is generally circular with a center opening 58 and a V-shaped slot 60 that extends outwardly from the center opening 58 to an outer edge 62 of the upper spring retainer. The slot 60 permits the upper spring retainer to be installed on the shaft 20 at the vicinity of the annular groove 54 through a snap-fit engagement. To that end, the upper spring retainer is preferably constructed of a material that is sufficiently resilient to allow expansion around the shaft 20 yet sufficiently rigid to stay in place and resist forces from a compression spring 64 when installed.

A lower spring retainer 66 preferably includes a generally flat base 68 that is positioned on the bottom wall 46 of the depression 42 and a boss 70 that extends upwardly from the base 68. The boss 70 is preferably sized to receive the spring 64 with a lower end of the spring resting on the base 66. A bore 72 extends through the boss 70 and base 68 and is sized for reciprocally receiving the shaft 20. When assembled, the compression spring 64 exerts opposing forces on the lower spring retainer 66 and the upper spring retainer 56 to thereby force the shaft 20 and stopper 18 toward the closed position. Although a coiled compression spring is preferred, it will be understood that any device for biasing the shaft and stopper toward the closed position can be used, including but not limited to elastomeric blocks, pressurized air cylinders, flat springs, and so on.

The actuator 22 is of conventional construction and is preferably of the linear-actuator type. The actuator 22 preferably includes an air cylinder 74 with an air inlet 75 and outlet 77 (FIG. 6). The plunger 52 reciprocates in and out of the cylinder 74 and is in a normally retracted position under biasing force from a compression spring 79 so that the stopper 18 is in the closed position against the valve seat 28 until the plunger 52 is activated. Once activated, the plunger 52 moves downwardly to exert an axial force against the shaft 20 against the biasing force of the spring 64 to thereby drive the shaft 20 and stopper 18 toward the open position. The actuator 22 is preferably activated when fluid pressure is applied through the air inlet 75, such as air pressure. However, it will be understood that the actuator 22 can be of any well-known linear or rotary type including hydraulic, solenoid, motorized or mechanically activated actuators or any other well-known actuating means.

The actuator 22 is preferably mounted to a platform 76 which is in turn connected to the valve body 12 via spacers 78. A pair of fasteners, such as bolts 80, extend through apertures 82 in the cylinder 74 and openings 86 in the platform 76 and are preferably secured by cap nuts 84 located on an opposite side of the platform 76 for securing the actuator 22 to the platform. The platform is preferably disk-shaped and includes a central opening 88 for accommodating the plunger 52 (FIGS. 5 and 6) of the actuator 22. A pair of fasteners, such as bolts 90, extend through apertures 92 in the platform 76, the spacers 78, and into threaded openings 94 formed in the valve body 12 for connecting the platform 76 to the valve body.

The provision of an actuator 22 separate from the valve body 12 simplifies the design, reduces manufacturing costs, and facilitates replacement of the actuator without removing the valve assembly 10 from the conduit or other system component to which it is attached, thereby eliminating the need to open the system and potentially expose it to contaminants.

As shown in FIGS. 4 and 5, the stop valve 16 is preferably embodied as a check valve, but may be in the form of a ball valve, butterfly valve, or any other configuration to stop the flow of fluid in at least one direction through the inlet 14. When embodied as a check valve, the stop valve 16 is preferably of conventional construction and includes a valve seat 96 mounted in the interior 98 of the sleeve 40, a plunger 100 mounted in the valve seat 96 for reciprocal movement with respect thereto, and a compression spring 102 extending between the valve seat 96 and plunger 100 for biasing the plunger 100 in a normally closed position where it sealingly engages the valve seat 96 in a well-known manner to thereby prevent fluid escape through the inlet 14 from the inner cavity 32 of the valve body 12. When pressurized air is applied to the stop valve 16 from a source outside of the valve body 12, the plunger 100 is forced toward an open position against biasing forces from the spring 102 to thereby supply drying air or other gases to the valve body 12 and the system to which it is connected.

Figure 7:
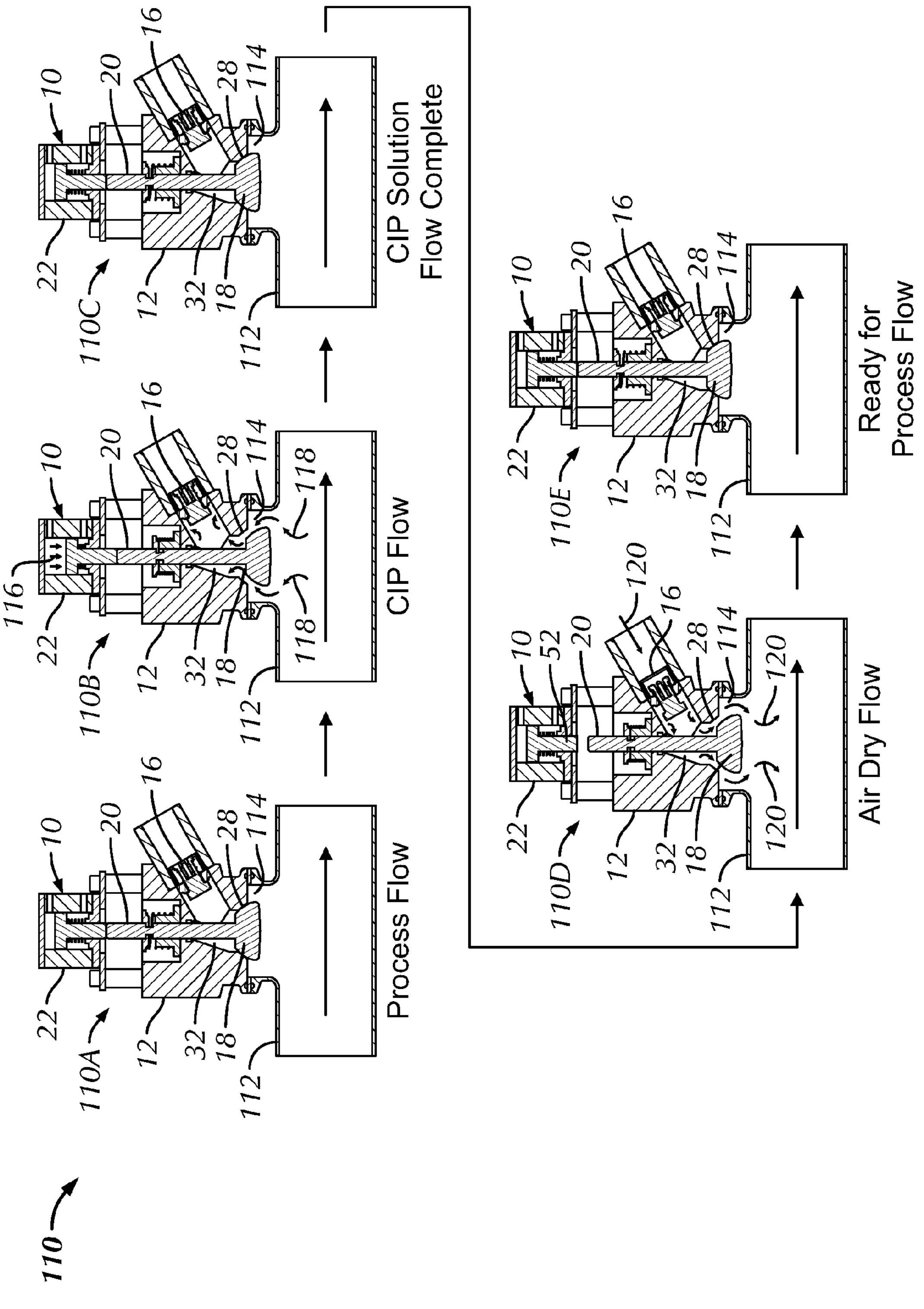
FIG. 7 illustrates a clean-in-place method showing a sectional view of the valve assembly at different operating positions in accordance with the present invention.

Referring now to FIG. 7, a clean-in-place method 110 in accordance with the present invention is illustrated, with sectional views of the valve assembly 10 and attached conduit 112 shown at various operational stages. It will be understood that the same method can be used for introducing air, gas and/or other fluids into the processing system during normal processing operations, such as when it is desirable to introduce a blanket or pocket of the air, gas or mixture of gases and/or other fluids during processing without departing from the spirit and scope of the invention.

During a normal processing operation and prior to the clean-in-place method, the valve assembly 10 is in the closed position, as shown at 110A, with the stopper 18 sealed against the valve seat 28 to thereby prevent processing fluids and/or particles from entering into the inner cavity 32 of the valve body 12. In this position, the actuator 22 is in a retracted or non-activated position and the stop valve 16 is closed. As previously described, fluid and/or particles from the processing flow may become trapped or lodged within a lower dead space 114 between the conduit and valve assembly, and into the small areas at the intersection of the stopper 18 and valve body 12. Because of the lower dead space 114, the process flow is typically insufficient to dislodge the trapped contaminants. Accordingly, when the process flow has ended, a clean-in-place operation is initiated at 110B wherein the actuator 22 is activated, as represented by arrows 116, to thereby move the shaft 20 in a downward direction and unseat the stopper 18 and move it toward an extended or open position. When cleaning fluid is introduced into the conduit 112, it will flow around the stopper 18, valve seat 28, and into the inner cavity 32, as represented by arrows 118. In this position, the stop valve 16 is closed. Preferably, cleaning fluid enters the inner cavity 32 only through the passageway created by the open stopper position. When the flow of cleaning fluid has stopped at 110C, the actuator 22 is deactivated and the stopper 18 returns to its retracted or closed position against the valve seat 28. Drying air is then introduced into the system at 110D by supplying a source of pressurized air to the stop valve 16, thereby causing the stop valve to open and introduce drying air into the inner cavity 32. The pressurized air preferably acts with sufficient force to move the stopper 18 away from the valve seat 28 without activation of the actuator 22 and introduces the drying air into the conduit 112 and rest of the system, as represented by arrows 120. In this position, the plunger 52 of the actuator 22 is spaced from the shaft 20. When the clean-in-place operation has finished, as shown at 110E, the pressurized air is removed from the stop valve 16 to thereby close the stop valve and cause the plunger 18 and shaft 20 to return to the closed position under biasing forces from the spring 64 (FIG. 5). In this position, the valve assembly 10 is ready for further processing operations.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

What is claimed is:

1. A valve assembly configured for a clean-in-place operation, the valve assembly comprising:

a valve body including:

a lower surface;

a valve seat extending into the valve body from the lower surface;

an inner cavity extending into the valve body from the valve seat;

an inlet extending through the valve body and into the inner cavity, the inlet being spaced from the valve seat;

a shaft extending through the valve body for reciprocal movement with respect thereto;

a stopper connected to one end of the shaft for movement between a normally closed position wherein the stopper sealingly engages the valve seat and an open position wherein the stopper is spaced from the valve seat to permit cleaning fluid to enter and exit the inner cavity only through a passageway created between the valve seat and stopper;

an actuator connected to the valve body, the actuator including a plunger adapted for contacting an opposite end of the shaft for moving the stopper toward the open position when activated; and a stop valve mounted on the valve body at the inlet location for opening and closing the inlet, the stop valve being in a normally closed position for preventing fluid from exiting through the inlet, the valve body being void of other inlets or outlets not associated with the stop valve such that cleaning fluid only enters and exits the inner cavity through the valve seat when the plunger is in the open position during the clean-in-place operation, the stop valve being connectable to a source of pressurized air to thereby open the stop valve and cause air or other gas to enter the inner cavity with sufficient pressure to move the stopper toward the open position;

wherein the inner cavity is shaped so that fluid entering the inner cavity only through the passageway between the valve seat and stopper cleans away contaminants that may have gathered on the stopper and in the inner cavity with the stop valve in the normally closed position, and further wherein the pressurized air entering the inner cavity through the stop valve removes fluid droplets and contaminants that may adhere to the inner cavity during the clean-in-place operation.

2. A valve assembly according to claim 1, wherein the shaft is spaced from the plunger when the stop valve is opened by the source of pressurized air.

3. A valve assembly according to claim 2, wherein the shaft is in contact with the plunger when the actuator is activated.

4. A valve assembly according to claim 1, and further comprising a compression spring connected between the shaft and the valve body for biasing the stopper toward the closed position.

5. A valve assembly according to claim 4, and further comprising a first spring seat connected to the shaft for receiving one end of the compression spring.

6. A valve assembly according to claim 5, wherein the valve body includes an upper surface and a depression extending into the valve body from the upper surface, the depression being coaxial with the shaft for receiving an opposite end of the compression spring.

7. A valve assembly according to claim 6, and further comprising a second spring seat located in the depression, the opposite end of the compression spring being received on the second spring seat.

8. A valve assembly according to claim 7, wherein the shaft includes an annular groove located between the stopper and the opposite end of the shaft, the first spring seat being mounted in the annular groove.

9. A valve assembly according to claim 8, and further comprising a platform connected to the valve body, with the actuator being mounted to the platform.

10. A valve assembly according to claim 9, and further comprising a plurality of spacers positioned between the platform and the valve body to thereby space the platform from the valve body.

11. A valve assembly according to claim 5, wherein the shaft includes an annular groove located between the stopper and the opposite end of the shaft, the first spring seat being mounted in the annular groove.

12. A valve assembly according to claim 1, and further comprising a platform connected to the valve body, with the actuator being mounted to the platform.

13. A valve assembly according to claim 12, and further comprising a plurality of spacers positioned between the platform and valve body to thereby space the platform from the valve body.

14. A valve assembly according to claim 13, wherein the shaft is spaced from the plunger when the stop valve is opened by the source of pressurized air.

15. A valve assembly according to claim 14, wherein the shaft is in contact with the plunger when the actuator is activated.

16. A valve assembly according to claim 1, wherein the inlet extends at an acute angle with respect to a central axis of the valve body.

17. A valve assembly according to claim 1, wherein the inner cavity has a first inner wall that extends upwardly from the valve seat and a second inner wall that extends upwardly and inwardly from the first inner wall and tapering toward the shaft such that the second inner wall forms a conical shape so that fluid droplets or contaminants that may adhere to the inner walls are efficiently removed when the pressurized air is applied through the open stop valve of the inlet.

18. A valve assembly configured for a clean-in-place operation, the valve assembly comprising:

a valve body including:

a lower surface;

an upper surface spaced from the lower surface;

a valve seat extending into the valve body from the lower surface;

an inner cavity extending into the valve body from the valve seat, the inner cavity including a first inner wall that extends upwardly from the valve seat and a second inner wall that extends upwardly and inwardly from the first inner wall such that the second inner wall forms a conical shape; and an inlet extending through the valve body and into the inner cavity;

a shaft extending through the valve body for reciprocal movement with respect thereto;

a stopper connected to one end of the shaft for movement between a normally closed position wherein the stopper sealingly engages the valve seat and an open position wherein the stopper is spaced from the valve seat to permit cleaning fluid to enter and exit the inner cavity only through a passageway created between the stopper and the valve seat;

a biasing member located outside of the inner cavity and connected to the shaft to thereby bias the stopper toward the normally closed position;

an actuator for moving the shaft and thus the stopper toward the open position; and a stop valve mounted on the valve body at the inlet location for opening and closing the inlet, the stop valve being in a normally closed position for preventing fluid from exiting through the inlet, the valve body being void of other inlets or outlets not associated with the stop valve such that cleaning fluid only enters and exits the inner cavity through the valve seat when the plunger is in the open position during the clean-in-place operation;

wherein the stop valve is operable independently of the actuator to move the stopper to the open position and deliver pressurized air directly into the inner cavity; and further wherein fluid entering the inner cavity only through the passageway between the valve seat and stopper cleans away contaminants that may have gathered on the stopper and in the inner cavity with the stop valve in the normally closed position, and further wherein the pressurized air entering the inner cavity through the stop valve removes fluid droplets and contaminants that may adhere to the inner cavity during the clean-in-place operation.

19. A valve assembly according to claim 18, and further comprising a platform connected to the valve body via a plurality of spacers positioned between the platform and valve body to thereby space the platform from the valve body, the actuator being removably mounted to the platform.

20. A clean-in-place method comprising:

connecting a clean-in-place valve to a conduit of a processing system, the valve including an inner cavity with a valve seat, and a stopper movable between a closed position in sealing engagement with the valve seat and an open position where the inner cavity is in fluid communication with the conduit;

flowing cleaning fluid through the conduit;

moving the stopper to the open position with an actuator to cause the fluid to flow only from the conduit around the stopper, past the valve seat, into the inner cavity, and drain back into the conduit without exiting the processing system to thereby clean the stopper, valve seat and inner cavity;

stopping the flow of cleaning fluid through the conduit;

moving the stopper to the closed position;

sending pressurized drying fluid into the inner cavity to thereby move the stopper to the open position independent of the actuator and supply the pressurized drying fluid to the inner cavity, the valve seat, the stopper and at least the conduit; and stopping the flow of pressurized drying fluid to thereby move the stopper to the closed position.

* * * * *